US012782259B2

(12) United States Patent
Ihara et al.

(10) Patent No.: US 12,782,259 B2
(45) Date of Patent: Nov. 3, 2026

(54) SYSTEM FOR AND METHOD OF MEASURING IN-ASH UNBURNED COMBUSTIBLES CONCENTRATION, AND ELECTROSTATIC SEPARATOR

(71) Applicant: KAWASAKI JUKOGYO KABUSHIKI KAISHA, Kobe (JP)

(72) Inventors: Takayuki Ihara, Kobe (JP); Keisuke Yamagata, Kobe (JP); Yasutaka Ozeki, Kobe (JP); Tomoyuki Suzuki, Kobe (JP); Koki Ikeda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 378 days.

(21) Appl. No.: 18/396,248

(22) Filed: Dec. 26, 2023

(65) Prior Publication Data

US 2024/0219283 A1 Jul. 4, 2024

(30) Foreign Application Priority Data

Dec. 28, 2022 (JP) ................................ 2022-211618

(51) Int. Cl.
*G01N 15/06* (2024.01)
*B03C 3/36* (2006.01)
(Continued)

(52) U.S. Cl.
CPC ......... *G01N 15/0656* (2013.01); *B03C 3/361* (2013.01); *B03C 3/68* (2013.01);
(Continued)

(58) Field of Classification Search
CPC ............... G01N 15/0656; G01N 15/06; G01N 15/0612; G01N 15/075; G01N 2015/0046; B03C 3/361; B03C 3/68; B03C 2201/24
See application file for complete search history.

(56) References Cited

FOREIGN PATENT DOCUMENTS

JP H02-130453 A 5/1990
JP H-08128947 A * 5/1996
(Continued)

OTHER PUBLICATIONS

JP-2949096-B1, English Translation (Year: 1999).*
(Continued)

*Primary Examiner* — Ryan D Walsh
(74) *Attorney, Agent, or Firm* — Oliff PLC

(57) ABSTRACT

A system for measuring an in-ash unburned combustibles concentration includes: a storage that stores therein the pieces of characteristic data; and an arithmetic processor including a selector and an in-ash unburned combustibles concentration calculator. The selector selects, from among the pieces of characteristic data stored, a piece of characteristic data whose first reflected light intensity index is the same as, or similar to, the first reflected light intensity index of subject ash. By using the correlation information contained in the piece of characteristic data that has been selected, the in-ash unburned combustibles concentration calculator calculates an in-ash unburned combustibles concentration corresponding to the second reflected light intensity index of the subject ash as the in-ash unburned combustibles concentration of the subject ash.

12 Claims, 4 Drawing Sheets

(51) Int. Cl.

| | |
|---|---|
| ***B03C 3/68*** | (2006.01) |
| ***G01N 15/00*** | (2024.01) |
| ***G01N 15/075*** | (2024.01) |

(52) U.S. Cl.

CPC ......... *G01N 15/06* (2013.01); *G01N 15/0612* (2013.01); *G01N 15/075* (2024.01); *B03C 2201/24* (2013.01); *G01N 2015/0046* (2013.01)

(56) References Cited

FOREIGN PATENT DOCUMENTS

| | | | | | |
|---|---|---|---|---|---|
| JP | 2949096 | B1 | * | 9/1999 | |
| JP | 3340990 | B2 | * | 11/2002 | |
| JP | WO2019230628 | A1 | * | 7/2021 | |
| KR | 20200006686 | A | * | 1/2020 | ............. F23N 5/003 |
| PL | 192035 | B1 | * | 8/2006 | ............. G01N 21/31 |

OTHER PUBLICATIONS

JP-3340990-B2, English Translation (Year: 2002).*
JPH-08128947-A, English Translation (Year: 1996).*
JP WO2019230628-A1, English Translation (Year: 2021).*
KR-20200006686-A, English Translation (Year: 2020).*
PL-192035-B1, English Translation (Year: 2006).*

* cited by examiner

SYSTEM FOR AND METHOD OF MEASURING IN-ASH UNBURNED COMBUSTIBLES CONCENTRATION, AND ELECTROSTATIC SEPARATOR

CROSS-REFERENCE TO RELATED APPLICATION

This application claims priority to and the benefit of Japanese Patent Application No. 2022-211618, filed on Dec. 28, 2022, the entire disclosure of which is incorporated herein by reference.

BACKGROUND OF THE INVENTION

1. Field of the Invention

The present disclosure relates to an in-ash unburned combustibles concentration measuring system for, and an in-ash unburned combustibles concentration measuring method of, measuring the mass proportion of unburned combustibles remaining in ash that is generated from the combustion of a fuel such as coal (hereinafter, this mass proportion is referred to as "in-ash unburned combustibles concentration"). The present disclosure also relates to an electrostatic separator including the in-ash unburned combustibles concentration measuring system.

2. Description of the Related Art

Conventionally, there has been proposed an in-ash unburned combustibles concentration measuring method that includes: irradiating ash with light; measuring the brightness of the ash based on the intensity of reflected light from the ash; and determining an in-ash unburned combustibles concentration based on the brightness of the ash. JP1990-130453A discloses an in-ash unburned combustibles concentration measuring system of this type.

JP1990-130453A discloses an ash color measuring device (i.e., an in-ash unburned combustibles concentration measuring system) including: a light source that emits light to ash adhered to filter paper; a reflected light sensor that detects reflected light from the ash and feeds an output corresponding to the brightness of the reflected light; a color determiner that determines the brightness of the ash based on the output from the reflected light sensor; and an arithmetic processor that calculates an in-ash unburned combustibles concentration based on correlation information between the brightness of the ash and the in-ash unburned combustibles concentration.

SUMMARY OF THE INVENTION

The color of ash that is generated from the combustion of a fuel is affected by the fuel type (i.e., fuel composition). Therefore, even in cases where the brightness of ash is the same, the in-ash unburned combustibles concentration may vary between these cases due to a fuel type difference (i.e., fuel composition difference) between these cases. Therefore, in the case of the in-ash unburned combustibles concentration measuring system of JP1990-130453A, unless suitable correlation information between the brightness of ash and in-ash unburned combustibles is selected in accordance with the type of the fuel or the type of the ash, there is a risk of reduced reliability in the determined value of the in-ash unburned combustibles concentration.

The present disclosure has been made in view of the above. An object of the present disclosure is to propose a technique that makes it possible to measure the in-ash unburned combustibles concentration with high reliability without being affected by a variation in the fuel type.

A system for measuring an in-ash unburned combustibles concentration according to one aspect of the present disclosure includes: a storage that stores therein pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash; and an arithmetic processor including: a selector that obtains the first reflected light intensity index of subject ash, and from among the pieces of characteristic data stored in the storage, selects a piece of characteristic data whose first reflected light intensity index is the same as, or similar to, the first reflected light intensity index of the subject ash; and an in-ash unburned combustibles concentration calculator that obtains the second reflected light intensity index of the subject ash, and by using the correlation information contained in the piece of characteristic data that has been selected, calculates an in-ash unburned combustibles concentration corresponding to the second reflected light intensity index of the subject ash as the in-ash unburned combustibles concentration of the subject ash.

An electrostatic separator according to another aspect of the present disclosure includes: an ash layer that is a layer of ash in which conductive particles and insulating particles are mixedly present; a conductive particle recovery container that recovers a first powder that is separated from the ash by electrostatic separation, the first powder containing the conductive particles; an insulating particle recovery container that recovers a second powder that is obtained by separating the first powder from the ash; and the above-described system for measuring an in-ash unburned combustibles concentration, wherein the system measures the in-ash unburned combustibles concentration of at least one of the first powder or the second powder.

A method of measuring an in-ash unburned combustibles concentration according to yet another aspect of the present disclosure includes: storing, in a storage, pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash; obtaining the first reflected light intensity index of subject ash, and from among the pieces of characteristic data stored in the storage, selecting a piece of characteristic data whose first reflected light intensity index is the same as, or similar to, the first reflected light intensity index of the subject ash; and obtaining the second reflected light intensity index of the subject ash, and by using the correlation information contained in the piece of characteristic data that has been selected, calculating an in-ash unburned combustibles concentration corresponding to the second reflected light intensity index of the subject ash as the in-ash unburned combustibles concentration of the subject ash.

The above object, other objects, features, and advantages of the present disclosure will be made clear by the following detailed description of a preferred embodiment with reference to the accompanying drawings.

DETAILED DESCRIPTION

Hereinafter, an embodiment of the present disclosure is described with reference to the drawings.

Figure 1:
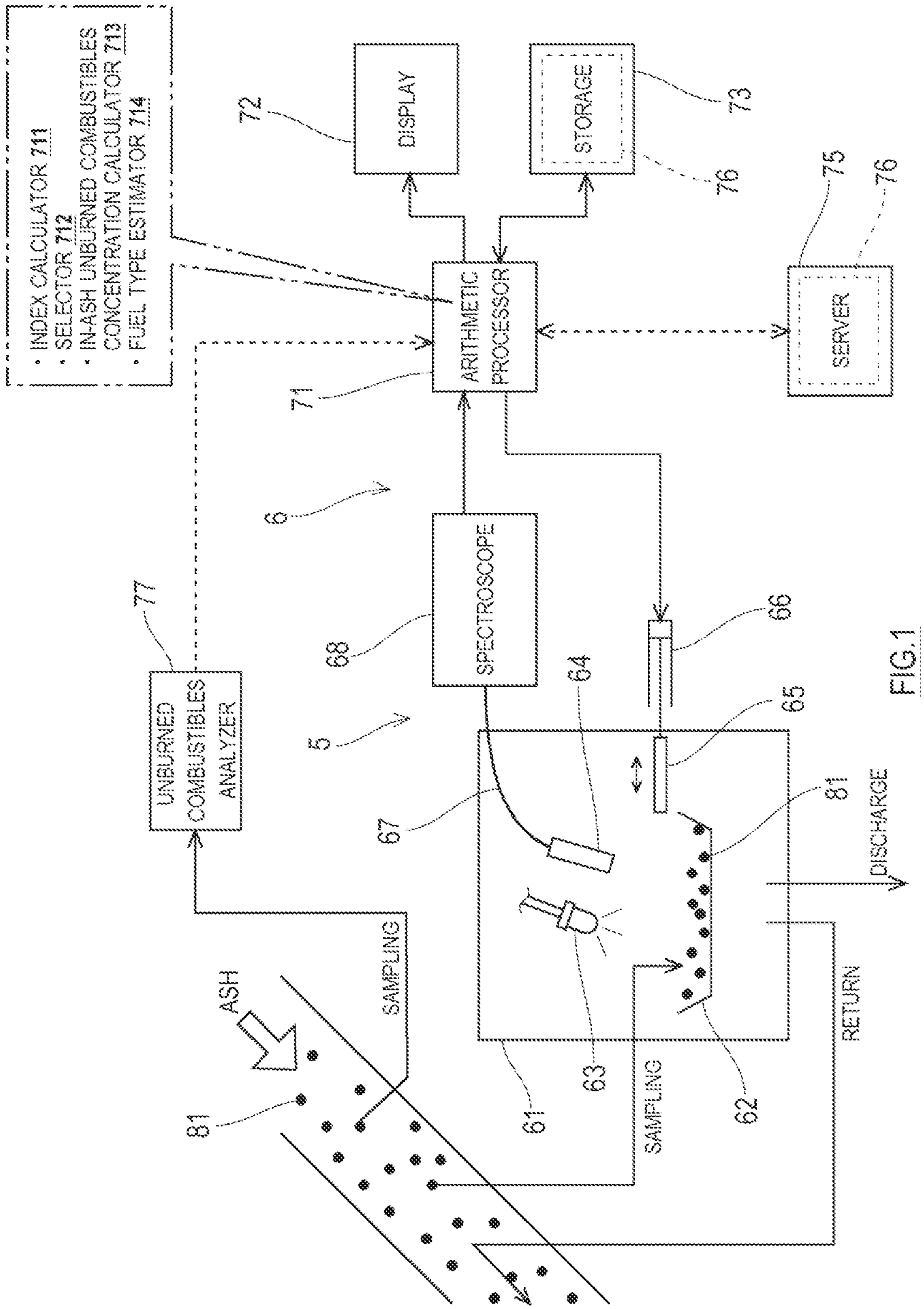
FIG. 1 shows a schematic configuration of an in-ash unburned combustibles concentration measuring system according to one embodiment of the present disclosure.

FIG. 1 shows a schematic configuration of an in-ash unburned combustibles concentration measuring system 6 according to one embodiment of the present disclosure. The in-ash unburned combustibles concentration measuring system 6 measures the in-ash unburned combustibles concentration of ash that is generated from the combustion of a fuel such as coal ash. The "in-ash unburned combustibles concentration" herein means the mass proportion of unburned combustibles remaining in the ash.

[Schematic Configuration of In-Ash Unburned Combustibles Concentration Measuring System 6]

The in-ash unburned combustibles concentration measuring system 6 includes a measurer 5, an arithmetic processor 71, and a storage 73. The measurer 5 measures the light intensity of reflected light from ash 81 (which may hereinafter be referred to as "reflected light intensity" of the ash 81). There are various types of reflection, such as specular reflection, diffuse reflection, and internal reflection. Although the reflection herein is not limited to a particular type, diffuse reflected light alone, or diffuse reflected light and specular reflected light, may be utilized to measure the in-ash unburned combustibles concentration.

Based on reflected light intensities of the ash 81 that are measured at multiple wavelengths, respectively, the arithmetic processor 71 determines a first reflected light intensity index I1 and a second reflected light intensity index I2, and determines the in-ash unburned combustibles concentration of the ash 81 by using the first reflected light intensity index I1 and the second reflected light intensity index I2. Each of the first reflected light intensity index I1 and the second reflected light intensity index I2 is an index indicating the reflected light intensity of ash. The same index may be adopted as the first reflected light intensity index I1 and the second reflected light intensity index I2. The first reflected light intensity index I1 is used mainly for specifying the fuel type of subject ash to be measured. The term "subject ash" herein means ash that is a subject for measurement. The second reflected light intensity index I2 is used mainly for specifying the in-ash unburned combustibles concentration of the subject ash.

The arithmetic processor 71 includes the following functional blocks: an index calculator 711, which determines the first reflected light intensity index I1 and the second reflected light intensity index I2 based on measured reflected light intensities of the subject ash; a selector 712, which selects a piece of characteristic data of the subject ash from among predefined pieces of characteristic data; an in-ash unburned combustibles concentration calculator 713, which calculates the in-ash unburned combustibles concentration of the subject ash; and a fuel type estimator 714, which estimates the fuel type of the subject ash. These function blocks are realized by the arithmetic processor 71 as a result of the arithmetic processor 71 executing a predetermined program. Processes performed by these functional blocks will be described in detail below.

The measurer 5 incudes a measurement case 61, a stage 62 located in the measurement case 61, a light source 63, a light receiver 64, a standard white board 65, a spectroscope 68, and an actuator 66. The distal end portion of an optical fiber 67 serves as the light receiver 64. Light received by the light receiver 64 is transmitted to the spectroscope 68 via the optical fiber 67.

The inside of the measurement case 61 serves as a darkroom. The light source 63 and the light receiver 64 are located in the upper part of the inside of the measurement case 61. The stage 62 is located within a region irradiated with light emitted from the light source 63. The ash 81 is fed to the stage 62. For example, part of ash that is transported through a conduit by an air stream or by its own weight is sampled, and the sampled ash is fed as the ash 81 onto the stage 62 through a sampling pipe or the like. The amount of the ash 81 may be set in advance.

The light source 63 desirably has a relatively wide wavelength band, and an output from the light source is desirably constant. Examples of such light source 63 include an incandescent lamp, halogen lamp, xenon lamp, laser excitation light source, and a multi-chip LED.

The light receiver 64 is located in such a manner that it can receive reflected light from the stage 62 and from the ash 81 on the stage 62. The light emitted from the light source 63 is reflected by the stage 62, the ash 81, or the standard white board 65, and is then incident on the light receiver 64. The light incident on the light receiver 64 is transmitted to the spectroscope 68 through the optical fiber 67. The spectroscope 68 separates the reflected light into multiple wavelengths, and measures a light intensity at each of the wavelengths. A spectroscope corresponding to the wavelength band of the light source 63 is adopted as the spectroscope 68. For example, in a case where the light source 63 is an incandescent lamp, in a wavelength band of about 400 to 850 nm, the light intensity may be measured every 4 nm. Alternatively, in an infrared region of about 900 to 1700 nm, the light intensity may be measured every 4 nm.

Through operation of the actuator 66, the standard white board 65 can be moved in a reciprocating manner between an advanced position and a retracted position. When the standard white board 65 is at the advanced position, the standard white board 65 is within the region irradiated by the light source 63, whereas when the standard white board 65 is at the retracted position, the standard white board 65 is out of the irradiated region. When the standard white board 65 is at the advanced position within the irradiated region, the standard white board 65 is irradiated with light. The light is reflected by the standard white board 65, and the reflected light is incident on the light receiver 64. When the standard white board 65 is at the retracted position out of the irradiated region, the standard white board 65 is irradiated with no light, but the stage 62 and the ash 81 on the stage 62 are irradiated with light. The light is reflected by the stage 62 or the ash 81, and the reflected light is incident on the light receiver 64. The standard white board 65 may be configured such that it is replaceable with the stage 62.

The arithmetic processor 71 controls the operation of the measurer 5, and performs calculations to determine an in-ash unburned combustibles concentration. There is a display 72 connected to the arithmetic processor 71. The display 72 outputs, i.e., displays, results of the calculations by the arithmetic processor 71. The storage 73 is connected to the arithmetic processor 71 so that information can be written into, and retrievable from, the storage 73.

The storage 73 includes a database 76 constructed therein. The database 76 stores information to be used by the arithmetic processor 71 when calculating the in-ash unburned combustibles concentration. The database 76 stores pieces of characteristic data. Each piece of characteristic data contains: identification information of ash; the fuel type of the ash; the first reflected light intensity index I1 of the ash; and correlation information between the second reflected light intensity index I2 of the ash and the in-ash unburned combustibles concentration of the ash. The arithmetic processor 71 can retrieve characteristic data from the database 76. The database 76 may be constructed in a server 75, which is communicably connected to the arithmetic processor 71 via a communication network. Information stored in the server 75 is retrievable not only by the arithmetic processor 71, but also by other information terminals.

The "fuel type" contained in the characteristic data is information on the type of a fuel from which ash was generated. Examples of the fuel type include: the name of a coal mine where coal was mined (i.e., the name of the production area of the coal); the grade of the coal (i.e., a coal type, such as anthracite, bituminous coal, subbituminous coal, or brown coal); and the type of a biomass fuel. Containing the fuel type in the characteristic data makes fuel type estimation possible.

The "first reflected light intensity index I1" contained in the characteristic data is a reflected light intensity, or is a value correlated with a reflected light intensity. The first reflected light intensity index I1 may be a spectrum of one of the following: a reflected light intensity; a calibrated reflected light intensity; a reflectance; and a standardized reflectance. The spectrum is such that the vertical axis thereof represents index value, whereas the horizontal axis thereof represents wavelength, and in the spectrum, index values at multiple wavelengths are arranged in order of wavelength. Here, the index value is a reflected light intensity, a calibrated reflected light intensity, a reflectance, or a standardized reflectance. Alternatively, the first reflected light intensity index I1 may be a spectrum of a value alternative to a reflected light intensity. The value alternative to a reflected light intensity is a value that does not directly indicate a reflected light intensity, but indirectly indicates a reflected light intensity.

The first reflected light intensity index I1 is different for each fuel type. In cases where the fuel type is the same, it is known that the first reflected light intensity index I1 is the same or similar between these cases. Accordingly, among the first reflected light intensity indexes I1 of known respective fuel types, one having the same shape as or a similar shape to that of the first reflected light intensity index I1 of the subject ash may be searched for, and based on the search result, the fuel type of the subject ash can be estimated.

The calibrated reflected light intensity is determined with Equation 1 shown below by using the measured reflected light intensity of the ash and the reflected light intensity of the standard white board.

$$\text{Calibrated reflected light intensity} = \text{reflected light intensity of the standard white board} - \text{reflected light intensity of the ash} \quad \text{Equation 1}$$

The reflectance is determined with Equation 2 shown below by using the measured reflected light intensity of the ash and the reflected light intensity of the standard white board.

$$\text{Reflectance} = \text{reflected light intensity of the ash} \div \text{reflected light intensity of the standard white board} \quad \text{Equation 2}$$

The standardized reflectance is determined with Equation 3 shown below by using the determined reflectance, an average reflectance value, and a predetermined coefficient K. The average reflectance value is an average value of the reflectance obtained in the wavelength band in which the measurement of the reflected light intensity is performed. The coefficient K is not particularly limited, so long as it is a positive number. The coefficient K is, for example, 2. The coefficient K may vary in accordance with the wavelength.

$$\text{Standardized reflectance} = \text{reflectance} \div (\text{average reflectance value} \times K) \quad \text{Equation 3}$$

In a case where the first reflected light intensity index I1 is a reflected light intensity spectrum, a spectrum in which the horizontal axis represents wavelength, the vertical axis represents reflected light intensity, and reflected light intensities at multiple wavelengths are arranged in order of wavelength, is adopted as the first reflected light intensity index I1. In a case where the first reflected light intensity index I1 is a calibrated reflected light intensity spectrum, a spectrum in which the horizontal axis represents wavelength, the vertical axis represents calibrated reflected light intensity, and calibrated reflected light intensities at multiple wavelengths are arranged in order of wavelength, is adopted as the first reflected light intensity index I1. In a case where the first reflected light intensity index I1 is a reflectance spectrum, a spectrum in which the horizontal axis represents wavelength, the vertical axis represents reflectance, and reflectances at multiple wavelengths are arranged in order of wavelength, is adopted as the first reflected light intensity index I1. In a case where the first reflected light intensity index I1 is a standardized reflectance spectrum, a spectrum in which the horizontal axis represents wavelength, the vertical axis represents standardized reflectance, and standardized reflectances at multiple wavelengths are arranged in order of wavelength, is adopted as the first reflected light intensity index I1. Any of these may be adopted as the first reflected light intensity index I1. However, since the first reflected light intensity index I1 is used for spectrum shape comparison, preferably, the standardized reflectance spectrum that has been adjusted such that the average value of the spectrum is substantially the same regardless of the fuel type is adopted as the first reflected light intensity index I1. For fuel type comparison, the standardized reflectance spectrum that has been adjusted such that the standardized reflectance maximum value is the same may be adopted.

The first reflected light intensity index I1 can be determined through a test. For example, the value of the reflected light intensity measured by the measurer 5 may be used as the first reflected light intensity index I1, or the first reflected light intensity index I1 can be determined by using the value of the reflected light intensity measured by the measurer 5.

The "correlation information between the second reflected light intensity index I2 of the ash and the in-ash unburned combustibles concentration" contained in the characteristic data is information indicating a relationship between the second reflected light intensity index I2 and the in-ash unburned combustibles concentration. There is a tendency for the reflected light intensity to decrease in proportion to the in-ash unburned combustibles concentration. In the case of the same fuel type, the less the reflected light intensity, the higher the in-ash unburned combustibles concentration. Accordingly, the in-ash unburned combustibles concentration can be estimated from a measured second reflected light intensity index I2 by using known correlation information between the second reflected light intensity index I2 and the in-ash unburned combustibles concentration.

The correlation information is, for example, a calibration curve indicating a relationship between the second reflected light intensity index I2 and the in-ash unburned combustibles concentration of ash whose in-ash unburned combustibles concentration is known. The correlation information is not limited to a calibration curve. Alternatively, the correlation information may express the relationship between the second reflected light intensity index I2 and the in-ash unburned combustibles concentration in the form of, for example, an equation or a table. The correlation information between the second reflected light intensity index I2 and the in-ash unburned combustibles concentration can be obtained through a test. The value of the second reflected light intensity index I2 used for calculating the in-ash unburned combustibles concentration may be the maximum value of the measured second reflected light intensity index I2, or may be cumulative values of the second reflected light intensity index I2 measured in a predetermined wavelength band, or may be the second reflected light intensity index I2 measured at a predetermined wavelength.

The second reflected light intensity index I2 is a reflected light intensity, or a value correlated with a reflected light intensity. The second reflected light intensity index I2 may be a reflected light intensity, a calibrated reflected light intensity, a standardized reflectance, or a reflectance. Since the second reflected light intensity index I2 is used to determine the in-ash unburned combustibles concentration based on a light intensity, it is preferable to adopt a reflectance or a calibrated reflected light intensity as the second reflected light intensity index I2.

[In-Ash Unburned Combustibles Concentration Measuring Method]

Figure 2:
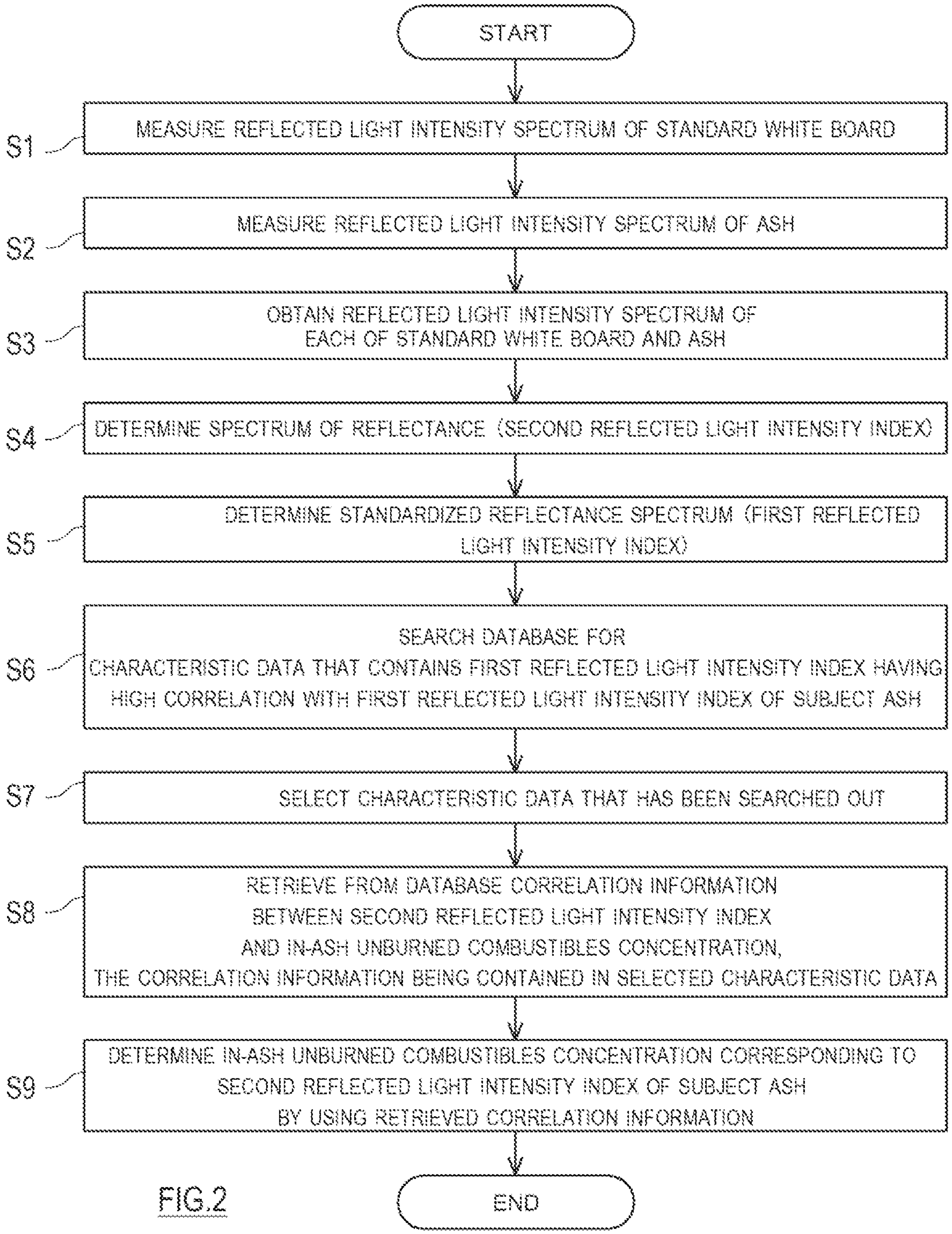
FIG. 2 shows a process flow chart of an in-ash unburned combustibles concentration measuring method.

Hereinafter, an in-ash unburned combustibles concentration measuring method using the in-ash unburned combustibles concentration measuring system 6 configured as above is described. FIG. 2 shows a process flow chart of the in-ash unburned combustibles concentration measuring method.

While the standard white board 65 is constantly in the state of being advanced by the actuator 66 to be in the region irradiated by the light source 63, the stage 62 of the measurer 5 is fed with the ash 81. Consequently, the ash 81 fed to the stage 62, and the light source 63 and the light receiver 64, are isolated from each other by the standard white board 65. Each of the light source 63, the light receiver 64, and the standard white board 65 is, at a suitable time, cleaned by air purging.

At an arbitrary timing, the reflected light intensity of the standard white board 65 is measured at each of multiple wavelengths, i.e., a reflected light intensity spectrum of the standard white board 65 is measured, by the measurer 5 (step S1). The measurer 5 may be controlled to measure the reflected light intensity spectrum at a preset time. For the standard white board 65, irradiation with the light emitted from the light source 63 and spectroscopic analysis by the spectroscope 68 are repeatedly performed m times. In a case where the measured reflected light intensity of the standard white board 65 is lower than a predetermined threshold, there is a possibility of deterioration of the light source 63. Therefore, the processing is ended. On the other hand, in a case where the reflected light intensity is higher than the predetermined threshold, the actuator 66 is operated to move the standard white board 65 from the irradiated region to the retracted position. At the time of emitting the light to, and performing the spectroscopic analysis on, the standard white board 65, the standard white board 65 is advanced to the position at which the standard white board 65 covers the stage 62. At the time, alternatively, the stage 62 may be replaced with the standard white board 65.

Next, the reflected light intensity of the ash 81 is measured at each of multiple wavelengths, i.e., a reflected light intensity spectrum of the ash 81 is measured, by the measurer 5 (step S2). For the ash 81, irradiation with the light emitted from the light source 63 and spectroscopic analysis by the spectroscope 68 are repeatedly performed n times. When the measurement is ended, the actuator 66 is operated to move the standard white board 65 to the advanced position in the irradiated region, and the ash 81 on the stage 62 is discharged from the measurement case 61. Thereafter, the stage 62 may be cleaned by air purging.

The arithmetic processor 71 obtains the reflected light intensity spectrum of the standard white board 65 and the reflected light intensity spectrum of the ash 81, which have been measured by the above-described series of operations (step S3). Here, the arithmetic processor 71 determines a standard deviation of the reflected light intensity spectrum of the standard white board 65, which has been measured m times, and a standard deviation of the reflected light intensity spectrum of the ash 81, which has been measured n times. Each standard deviation is compared with a predetermined threshold, and if the standard deviation is greater than the predetermined threshold, there is a possibility of deterioration of the light source 63, insufficiency in the air purging of the aforementioned components, malfunctioning of the measurer 5 such as a failure in feeding the ash to the stage 62, or a measurement error. Therefore, a warning is outputted on the display 72, and the processing is ended. In a case where the standard deviation is less than or equal to the predetermined threshold, the arithmetic processor 71 continues the processing.

Figure 3:
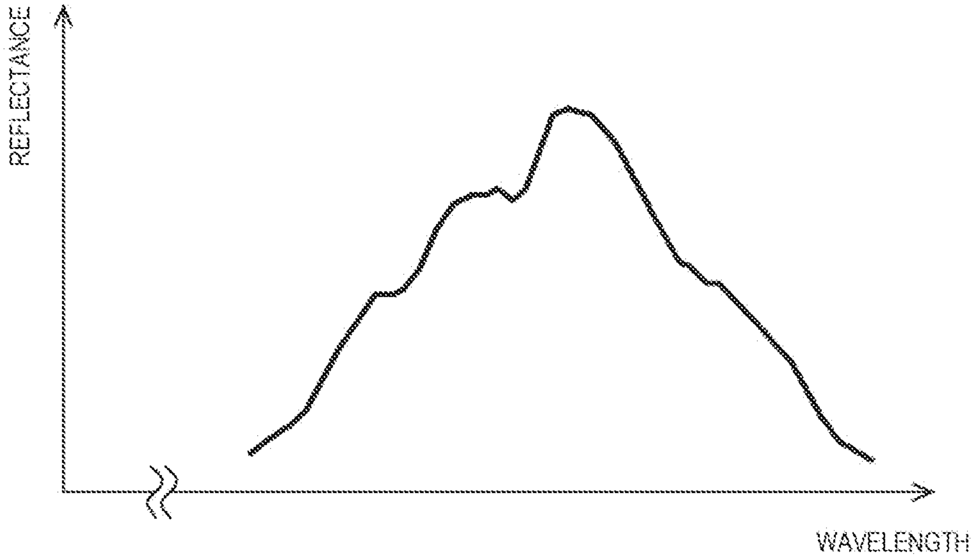
FIG. 3 shows one example of a reflectance waveform.

The index calculator 711 of the arithmetic processor 71 determines a reflectance spectrum from the measured reflected light intensity spectrum of the ash 81 (step S4). In a reflectance determined by dividing the reflected light intensity of the ash 81 by the reflected light intensity of the standard white board 65, an influence of a progress in time deterioration of the light source 63 is eliminated from the measured reflected light intensity of the ash 81. At the time of determining the reflectance, the reflected light intensity of the ash 81 at each wavelength may be an average value of the reflected light intensity measured n times, and similarly, the reflected light intensity of the standard white board 65 at each wavelength may be an average value of the reflected light intensity measured m times. FIG. 3 shows one example of the reflectance spectrum.

Figure 4:
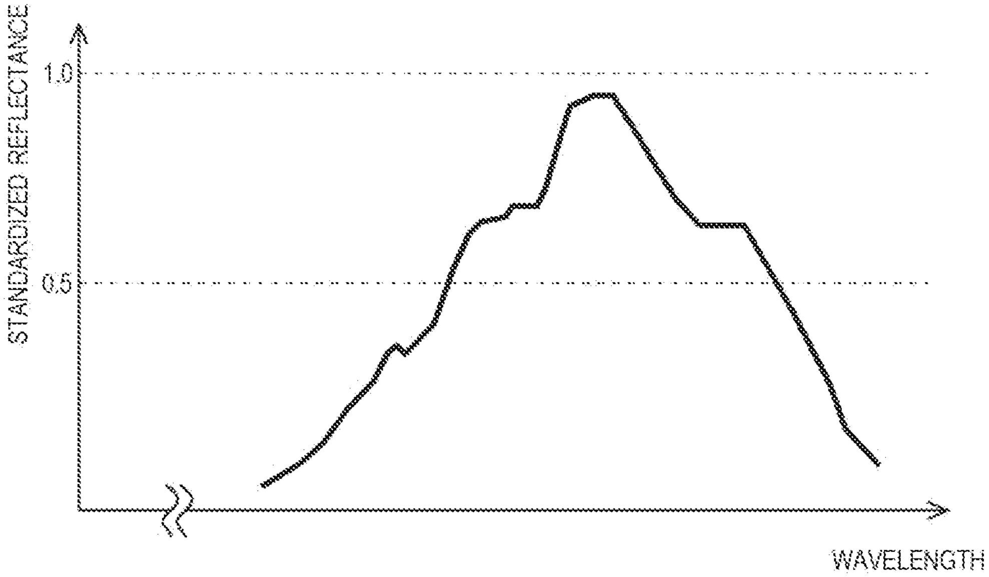
FIG. 4 shows one example of a standardized reflectance waveform.

The index calculator 711 of the arithmetic processor 71 determines a standardized reflectance spectrum from the reflectance spectrum (step S5). FIG. 4 shows one example of the standardized reflectance spectrum.

For test ash 81, for which the fuel type and the in-ash unburned combustibles concentration are known, the above-described process steps S1 to S5 are performed to obtain the following: a measured reflected light intensity spectrum of the standard white board 65; a measured reflected light intensity spectrum of the test ash 81; a reflectance spectrum of the test ash 81; and a standardized reflectance spectrum of the test ash 81. Identification information, fuel type, and in-ash unburned combustibles concentration of the test ash 81, the measured reflected light intensity spectrum of the standard white board 65, the measured reflected light intensity spectrum of the test ash 81, the reflectance spectrum of the test ash 81, the standardized reflectance spectrum of the test ash 81, and correlation information between the reflectance spectrum of the test ash 81 and the in-ash unburned combustibles concentration of the test ash 81 are stored in the database 76 as characteristic data of the test ash 81 in association with the identification information of the test ash 81. The correlation information between the reflectance spectrum of the test ash 81 and the in-ash unburned combustibles concentration of the test ash 81 may be generated from the reflectance spectrum of the test ash 81 and the in-ash unburned combustibles concentration of the test ash 81. In the present embodiment, among the information contained in the characteristic data, the standardized reflectance spectrum of the ash 81 is used as the first reflected light intensity index I1, and the reflectance of the ash 81 is used as the second reflected light intensity index I2. Thus, the database 76 prestores pieces of characteristic data. The characteristic data to be accumulated in the database 76 may be sequentially added or updated based on actual measurement results of the in-ash unburned combustibles concentration.

The in-ash unburned combustibles concentration of the test ash 81 may be measured by using an unburned combustibles analyzer 77. In the unburned combustibles analyzer 77, the test ash 81 is put into a test container; the mass of the test ash 81 before being subjected to ignition is measured; the test ash 81 in the test container is subjected to the ignition; the amount of carbon dioxide contained in a resulting flue gas is measured by infrared analysis; and the proportion of the amount of generated carbon dioxide to the mass of the test ash 81 before being subjected to the ignition is calculated as the in-ash unburned combustibles concentration. The in-ash unburned combustibles concentration measuring system 6 can continuously measure the in-ash unburned combustibles concentration of the ash 81 within a short period of time. However, in the unburned combustibles analyzer 77, it relatively takes time to perform measuring work that includes, for example, putting the test ash 81 into the test container, placing the test container containing the test ash 81 into a heating furnace, taking it out of the heating furnace, and a heating time. The unburned combustibles analyzer 77 is not limited to such a measurement method as gas analysis on gas generated after ignition (e.g., infrared analysis or X-ray fluorescence analysis). For example, a loss-on-ignition test method is applicable to the unburned combustibles analyzer 77. The unburned combustibles analyzer 77 may be installed at a location remote from the measurer 5.

Returning to FIG. 2, from among the pieces of characteristic data in the database 76, the selector 712 of the arithmetic processor 71 searches for the characteristic data that contains the first reflected light intensity index I1 having high correlation with the first reflected light intensity index I1 of the subject ash 81 (step S6), and selects the characteristic data that has been searched out, or selects the identification information of the characteristic data (step S7). In the present embodiment, since the standardized reflectance spectrum is used as the first reflected light intensity index I1, an expression "a spectrum having high correlation with another spectrum" means that the shapes of the respective two spectra are the same or similar to each other. The expression "a spectrum having high correlation with another spectrum" also means that a deviation between the two spectra is small. The characteristic data that contains the first reflected light intensity index I1 having high correlation with the first reflected light intensity index I1 of the subject ash 81 may be specified by using a machine-learned model.

The in-ash unburned combustibles concentration calculator 713 of the arithmetic processor 71 retrieves, from the database 76, correlation information between the second reflected light intensity index I2 and the in-ash unburned combustibles concentration, the correlation information being contained in the characteristic data selected in step S7 (step S8), and by using the retrieved correlation information, the in-ash unburned combustibles concentration corresponding to the second reflected light intensity index I2 of the subject ash 81 is determined as the in-ash unburned combustibles concentration of the subject ash 81 (step S9). To calculate the in-ash unburned combustibles concentration, the second reflected light intensity index I2 of the subject ash 81 at a particular wavelength may be used, or the second reflected light intensity index I2 of the subject ash 81 at each of all the wavelengths at which the measurement of the reflected light intensity is performed may be used.

For the subject ash 81, the arithmetic processor 71 generates new characteristic data that contains the determined in-ash unburned combustibles concentration, the measured reflected light intensity spectrum, the reflectance spectrum, and the standardized reflectance spectrum, and stores the generated new characteristic data in the database 76 in association with the identification information of the subject ash 81.

The in-ash unburned combustibles concentration of the subject ash 81 may be measured by the unburned combustibles analyzer 77. In this case, the in-ash unburned combustibles concentration measured by the in-ash unburned combustibles concentration measuring system 6 may be compared with the in-ash unburned combustibles concentration measured by the unburned combustibles analyzer 77 to evaluate the measurement precision of the in-ash unburned combustibles concentration measuring system 6. The characteristic data of the subject ash 81 that is stored in the storage 73, or the characteristic data of ash whose fuel type corresponds to that of the subject ash 81, may be modified or corrected based on the in-ash unburned combustibles concentration measured by the unburned combustibles analyzer 77. Accordingly, the characteristic data is sequentially updated properly, which allows the in-ash unburned combustibles concentration measuring system 6 to measure the in-ash unburned combustibles concentration with higher precision.

[Application Example of the In-Ash Unburned Combustibles Concentration Measuring System 6]

Figure 5:
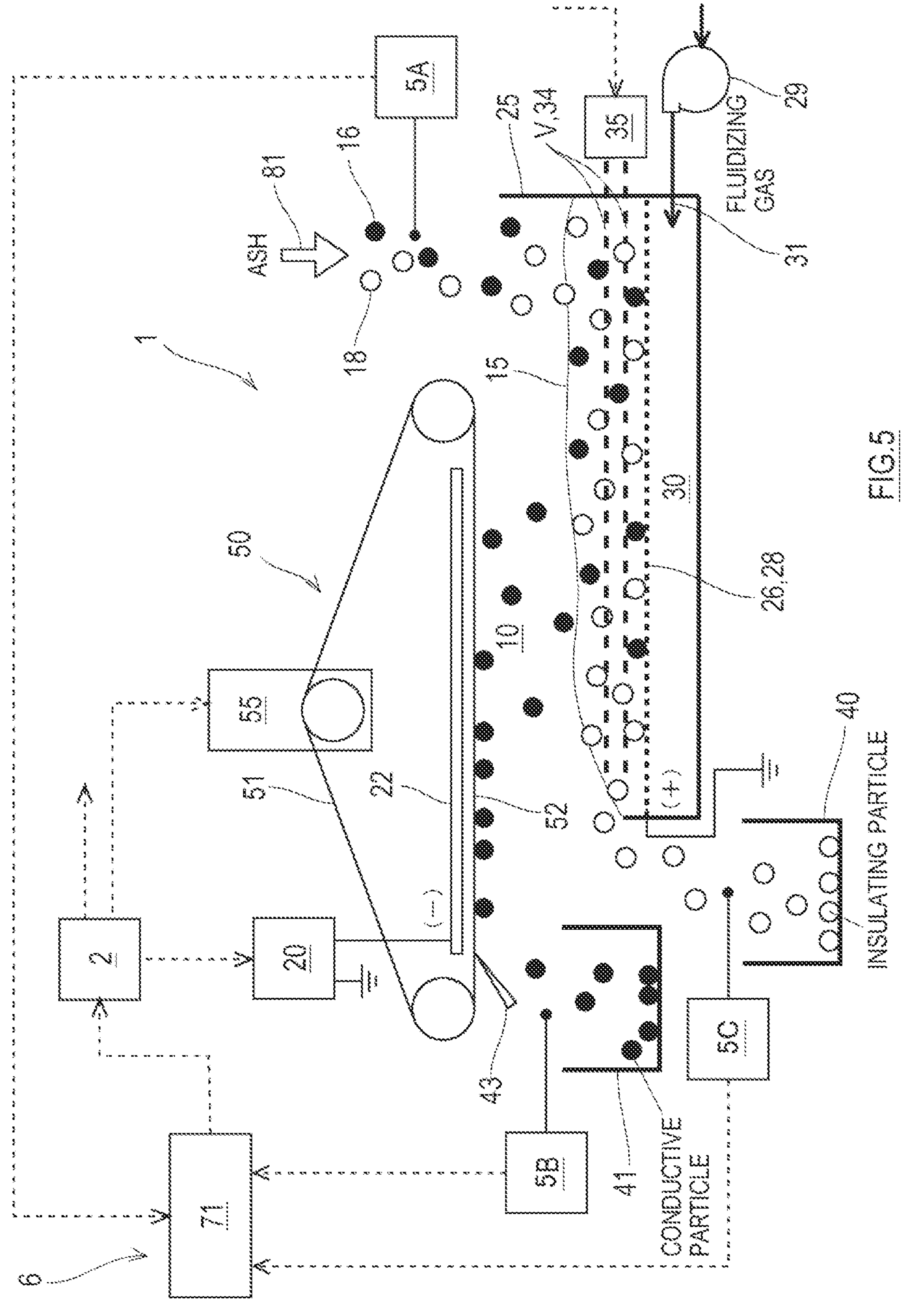
FIG. 5 shows an overall configuration of an electrostatic separator according to one embodiment of the present disclosure.

Next, an example in which the in-ash unburned combustibles concentration measuring system 6 is applied to an electrostatic separator 1 is described. FIG. 5 shows an overall configuration of the electrostatic separator 1 according to one embodiment of the present disclosure. The electrostatic separator 1 mainly separates conductive particles 16 from the ash 81, in which the conductive particles 16 and insulating particles 18 are mixedly present. The electrostatic separator 1 is usable for separating, for example, unburned carbon from coal ash (ash 81) that contains both the unburned carbon (conductive particles 16) and ash content (insulating particles 18). Hereinafter, the configuration of the electrostatic separator 1 is described in detail. However, the configuration of the electrostatic separator 1 to which the in-ash unburned combustibles concentration measuring system 6 is applied is not limited to this example. The in-ash unburned combustibles concentration measuring system 6 is widely applicable to various devices that perform electrostatic separation to separate the conductive particles 16 from the ash 81.

[Configuration of Electrostatic Separator 1]

The electrostatic separator 1 shown in FIG. 5 includes: a container 25 accommodating an ash layer 15 therein; a gas dispersion plate 26 located at the bottom of the ash layer 15; at least one vibrator V in the ash layer 15, the at least one vibrator V being located on the same plane as that of the gas dispersion plate 26 (or located above the gas dispersion plate 26); a fluidizing gas feeder 29, which feeds fluidizing gas 31 through the gas dispersion plate 26 to lift the ash layer 15; an upper electrode 22 located above the ash layer 15; a lower electrode 28 in the ash layer 15, the lower electrode 28 being located on the same plane as that of the gas dispersion plate 26 (or located above the gas dispersion plate 26); a capturer 50; a power supply 20; and control circuitry 2.

A conveyor-type capturer is adopted as the capturer 50. The capturer 50 includes: an endless conveyor belt 51; and a rotation driver 55 of the conveyor belt 51. The conveyor belt 51 is made of a non-conducting material.

The upper electrode 22 is located at the inner side of the annular conveyor belt 51. The outer annular surface of the conveyor belt 51 serves as a transporting surface 52. An area that is located above the ash layer 15 but below the upper electrode 22 is defined as a "capturing area 10". The conveyor belt 51 rotates and passes through the capturing area 10 in such an orientation that the transporting surface 52 is facing downward. The transporting surface 52 of the conveyor belt 51 may be substantially horizontal when passing through the capturing area 10.

The capturer 50 includes a particle separator 43. A conductive particle recovery container 41 is located below the particle separator 43. The particle separator 43 is, for example, a spatula-shaped component. With the particle separator 43, particles attached to the conveyor belt 51 can be scraped off the conveyor belt 51. One example of the spatula-shaped particle separator 43 is a scraper. Alternatively, the particle separator 43 may be a component having a static-eliminating function, and the particle separator 43 may separate the particles from the conveyor belt 51 by eliminating static electricity from the particles attached to the conveyor belt 51. Examples of the particle separator 43 having a static-eliminating function include a static-eliminating brush.

The gas dispersion plate 26 with a large number of fine holes is located at the bottom of the container 25. The gas dispersion plate 26 may be a porous plate or a porous sheet. An inclination angle of the gas dispersion plate 26 may be variable. In the present disclosure, a metal gas dispersion plate is adopted as the gas dispersion plate 26, and the gas dispersion plate 26 also serves as the lower electrode 28. A feeder feeds the container 25 with the ash 81, in which the conductive particles 16 and the insulating particles 18 are mixedly present. The ash 81 is accumulated in the container 25, and forms the ash layer 15.

The ash 81 is continuously or intermittently fed to a first side of the container 25, and as a result, the ash 81 gradually moves from the first side of the container 25 toward a second side, i.e., the other side, of the container 25. An insulating particle recovery container 40, which recovers particles (mainly the insulating particles 18) that have overflowed from the container 25, is located at the second side of the container 25.

A wind box 30 is located under the container 25. The wind box 30 is fed with the fluidizing gas 31 from the fluidizing gas feeder 29. The fluidizing gas 31 may be air, for example. Desirably, the fluidizing gas 31 is dehumidified gas. The fluidizing gas 31 from the wind box 30 is introduced into the ash layer 15 from the bottom of the container 25, and lifts the ash layer 15 while passing through the gas dispersion plate 26, the lower electrode 28, and a middle electrode 34.

The at least one vibrator V is, in the ash layer 15, located on the same plane as that of the gas dispersion plate 26 or located above the gas dispersion plate 26. The vibrator V is caused to vibrate by a vibration exciter 35. The amplitude and vibration speed of the vibrator V are variable. In the present embodiment, the vibrator V is configured as a metal mesh plate that is, in the ash layer 15, located above the gas dispersion plate 26, and the vibrator V also serves as the middle electrode 34. However, the middle electrode 34 may be eliminated, and the vibrator V may serve only as a vibrator.

The power supply 20 applies voltage between the upper electrode 22 and the lower electrode 28, which face each other in the vertical direction, such that one of the upper and lower electrodes 22 and 28 acts as a negative (−) electrode and the other one of the upper and lower electrodes 22 and 28 acts as a positive (+) electrode, and such that an electric field is generated between the positive and negative electrodes. In the present embodiment, the power supply 20 applies negative voltage to the upper electrode 22, and the lower electrode 28 is grounded, so that the upper electrode 22 acts as a negative electrode and the lower electrode 28 acts as a positive electrode. As one example, in a case where the distance between the upper electrode 22 and the lower electrode 28 is within a range from several tens of mm to several hundreds of mm, the absolute value of the intensity of the electric field generated between the upper electrode 22 and the lower electrode 28 may be about 0.1 to 1.5 kV/mm.

Further, the middle electrode 34 acts as either a negative electrode or a positive electrode, and the power supply 20 applies voltage between the upper electrode 22 and the middle electrode 34, such that the polarity of the middle electrode 34 is the same as that of the lower electrode 28. The potential difference between the upper electrode 22 and the middle electrode 34 is not particularly limited, so long as it is less than or equal to the potential difference between the upper electrode 22 and the lower electrode 28.

The control circuitry 2 controls the operation of the electrostatic separator 1. Specifically, the control circuitry 2 is connected to the power supply 20, the rotation driver 55, and the vibration exciter 35, and outputs control commands to them. The control circuitry 2 operates the power supply 20 so that suitable electric field intensity will be obtained. The control circuitry 2 operates the vibration exciter 35 so that a suitable vibration speed and amplitude of the vibrator V will be obtained. The control circuitry 2 operates the rotation driver 55 so that a suitable rotation speed of the conveyor belt 51 will be obtained. The feeding amount of the ash 81 to the container 25 may be controlled by the control circuitry 2.

[Electrostatic Separation Method]

Hereinafter, an electrostatic separation method using the electrostatic separator 1 configured as above is described. In the electrostatic separator 1, due to the electric field generated between the upper electrode 22 and the lower electrode 28, dielectric polarization occurs on the conveyor belt 51, which is a non-conductor (insulator, inducer), and a negative or positive electric charge corresponding to the upper electrode 22 occurs on the downward-facing transporting surface 52 of the conveyor belt 51, which is passing through the capturing area 10. In the present embodiment, since the upper electrode 22 is a negative electrode, a negative electric charge occurs on the transporting surface 52.

The ash layer 15 in the container 25 is being fluidized by the fluidizing gas 31, and vertical and horizontal flows of the ash 81 are occurring in the ash layer 15. That is, the ash layer 15 is being agitated. As a result of the agitation, the conductive particles 16 that have come into contact with the lower electrode 28 and/or the middle electrode 34 are positively or negatively charged corresponding to the lower electrode 28. In the present embodiment, since the lower electrode 28 is a positive electrode, the conductive particles 16 are positively charged. The insulating particles 18 (non-conductor) are not charged even when in contact with the lower electrode 28.

The charged conductive particles 16 are moved by the flow of the ash 81 to the layer surface of the ash layer 15, and attracted by electrostatic force to the downward-facing transporting surface 52 of the conveyor belt 51, so that the conductive particles 16 fly out of the ash layer 15 to get attached to the downward-facing transporting surface 52. Since the conductive particles 16 do not directly come into contact with the upper electrode 22, the conductive particles 16 can be kept charged and can be kept in the state of being attracted to the downward-facing transporting surface 52 of the conveyor belt 51.

The conductive particles 16 thus attached to the transporting surface 52 of the conveyor belt 51 are carried to the outside of the electric field due to the rotation of the conveyor belt 51. Then, outside the electric field, the conductive particles 16 are scraped off the transporting surface 52 of the conveyor belt 51 by the particle separator 43 to be recovered into the conductive particle recovery container 41.

Meanwhile, since the insulating particles 18 in the ash layer 15 are not charged, they are not attracted by the electrostatic force to the downward-facing transporting surface 52 of the conveyor belt 51, and remain in the ash layer 15. As the ash 81 fed into the container 25 moves from the first side toward the second side of the container 25, the proportion of the conductive particles 16 in the ash 81 decreases, whereas the proportion of the insulating particles 18 in the ash 81 increases. The insulating particle recovery container 40 located at the second side of the container 25 recovers the ash 81, which has overflowed from the container 25 and in which the proportion of the insulating particles 18 is high.

[Application of the In-Ash Unburned Combustibles Concentration Measuring System 6]

The electrostatic separator 1 configured as above includes the in-ash unburned combustibles concentration measuring system 6. The in-ash unburned combustibles concentration measuring system 6 measures the in-ash unburned combustibles concentration of a powder C that flows into the insulating particle recovery container 40. The in-ash unburned combustibles concentration measuring system 6 may further measure the in-ash unburned combustibles concentration of at least one of the following: the ash 81 that flows into the container 25 and that has not yet been subjected to the electrostatic separation; and a powder B that flows into the conductive particle recovery container 41. The in-ash unburned combustibles concentration measuring system 6 of the electrostatic separator 1 according to the present disclosure can measure the in-ash unburned combustibles concentration of each of the ash 81, the powder B, and the powder C.

The in-ash unburned combustibles concentration measuring system 6 includes a first measurer 5A, a second measurer 5B, and a third measurer 5C. The first measurer 5A samples the ash 81 that flows into the container 25, and measures reflected light intensities of the ash 81 at multiple wavelengths, respectively, i.e., measures a reflected light intensity spectrum of the ash 81. The second measurer 5B samples the powder B that flows into the conductive particle recovery container 41, and measures reflected light intensities of the powder B at multiple wavelengths, respectively, i.e., measures a reflected light intensity spectrum of the powder B. The third measurer 5C samples the powder C that flows into the insulating particle recovery container 40, and measures reflected light intensities of the powder C at multiple wavelengths, respectively, i.e., measures a reflected light intensity spectrum of the powder C. The arithmetic processor 71 obtains, from each of the first to third measurers 5A, 5B, and 5C, information on the reflected light intensities at the respective wavelengths, determines the in-ash unburned combustibles concentration of each of the ash 81, the powder B, and the powder C, and outputs, i.e., displays, the determined in-ash unburned combustibles concentrations on the display 72.

The powder B contains a large amount of unburned carbon, i.e., a large amount of conductive particles 16. The powder C contains a large ash content, i.e., a large amount of insulating particles 18. Therefore, in a case where the ash 81 is properly subjected to the electrostatic separation by the electrostatic separator 1, the in-ash unburned combustibles concentration of the powder C is lower than the in-ash unburned combustibles concentration of the raw material, and is also lower than the in-ash unburned combustibles concentration of the powder B. In a case where the in-ash unburned combustibles concentration of the powder C is higher than a predetermined threshold, it can be assumed that the electrostatic separation has not been sufficiently done, and that a large amount of conductive particles 16 are contained in the powder C. On the other hand, in a case where the in-ash unburned combustibles concentration of the powder B is lower than a predetermined threshold, it can be assumed that a large amount of insulating particles 18 are contained in the powder B.

Based on the in-ash unburned combustibles concentrations of the ash 81, the powder B, and the powder C, respectively, which are displayed on the display 72, an operator can adjust control parameters that affect the electrostatic separation performed by the electrostatic separator 1 so that the electrostatic separation will be performed properly. The control parameters of the electrostatic separator 1 include the feeding amount of the ash 81, the electric field intensity, the transporting speed of the conveyor belt 51, the vibration speed and amplitude of the vibrator V, etc.

Alternatively, information on the in-ash unburned combustibles concentrations of the ash 81, the powder B, and the powder C, respectively, which are measured by the in-ash unburned combustibles concentration measuring system 6, is transmitted to the control circuitry 2, and based on the in-ash unburned combustibles concentrations of the ash 81, the powder B, and the powder C, respectively, the control circuitry 2 may automatically adjust the control parameters of the electrostatic separator 1 so that the electrostatic separation will be performed properly. In this case, the control circuitry 2 may adjust the control parameters of the electrostatic separator 1, such that the in-ash unburned combustibles concentration of the powder B is higher than or equal to a predetermined first threshold. Alternatively, the control circuitry 2 may adjust the control parameters of the electrostatic separator 1, such that the in-ash unburned combustibles concentration of the powder C is less than or equal to a predetermined second threshold. Further alternatively, the control circuitry 2 may adjust the control parameters of the electrostatic separator 1, such that a value obtained by dividing the in-ash unburned combustibles concentration of the powder C by the in-ash unburned combustibles concentration of the ash 81 is less than or equal to a predetermined third threshold.

SUMMARY

As described above, the in-ash unburned combustibles concentration measuring system 6 according to a first item of the present disclosure includes: the storage 73, which stores therein pieces of characteristic data, each piece of characteristic data being characteristic data of ash 81 and containing the first reflected light intensity index I1 of the ash 81 and correlation information between the second reflected light intensity index I2 of the ash 81 and the in-ash unburned combustibles concentration of the ash 81, wherein each of the first reflected light intensity index I1 and the second reflected light intensity index I2 is an index indicating a reflected light intensity of the ash 81; and the arithmetic processor 71 including: the selector 712, which obtains the first reflected light intensity index I1 of the subject ash 81, and from among the pieces of characteristic data stored in the storage 73, selects a piece of characteristic data whose first reflected light intensity index I1 is the same as, or similar to, the first reflected light intensity index I1 of the subject ash 81; and the in-ash unburned combustibles concentration calculator 713, which obtains the second reflected light intensity index I2 of the subject ash 81, and by using the correlation information contained in the piece of characteristic data that has been selected, calculates an in-ash unburned combustibles concentration corresponding to the second reflected light intensity index I2 of the subject ash 81 as the in-ash unburned combustibles concentration of the subject ash 81.

The in-ash unburned combustibles concentration measuring system 6 according to a second item of the present disclosure is configured such that the in-ash unburned combustibles concentration measuring system 6 according to the first item further includes the measurer 5 including: the light source 63, which irradiates the ash 81 with light; and the spectroscope 68, which separates reflected light from the ash 81 into multiple wavelengths, and measures reflected light intensities at the multiple wavelengths, respectively. The arithmetic processor 71 further includes the index calculator 711, which obtains, for the subject ash 81, the reflected light intensities that have been measured by the measurer 5 at the multiple wavelengths, respectively, and based on the obtained reflected light intensities at the multiple wavelengths, calculates the first reflected light intensity index I1 and the second reflected light intensity index I2 of the subject ash 81.

An in-ash unburned combustibles concentration measuring method according to item 9 of the present disclosure includes: storing, in the storage 73, pieces of characteristic data, each piece of characteristic data being characteristic data of ash 81 and containing the first reflected light intensity index I1 of the ash 81 and correlation information between the second reflected light intensity index I2 of the ash 81 and the in-ash unburned combustibles concentration of the ash 81, wherein each of the first reflected light intensity index I1 and the second reflected light intensity index I2 is an index indicating a reflected light intensity of the ash 81; obtaining the first reflected light intensity index I1 of the subject ash 81, and from among the pieces of characteristic data stored in the storage 73, selecting a piece of characteristic data whose first reflected light intensity index I1 is the same as, or similar to, the first reflected light intensity index I1 of the subject ash 81; and obtaining the second reflected light intensity index I2 of the subject ash 81, and by using the correlation information contained in the piece of characteristic data that has been selected, calculating an in-ash unburned combustibles concentration corresponding to the second reflected light intensity index I2 of the subject ash 81 as the in-ash unburned combustibles concentration of the subject ash 81.

The in-ash unburned combustibles concentration measuring method according to a tenth item of the present disclosure is such that the in-ash unburned combustibles concentration measuring method according to the ninth item further includes: irradiating the subject ash 81 with light; separating, by the spectroscope 68, reflected light from the subject ash 81 into multiple wavelengths, and measuring reflected light intensities at the multiple wavelengths, respectively; and calculating the first reflected light intensity index I1 and the second reflected light intensity index I2 based on the reflected light intensities of the subject ash 81 that have been measured at the multiple wavelengths, respectively.

According to the in-ash unburned combustibles concentration measuring system 6 of the first and second items and the in-ash unburned combustibles concentration measuring method of the ninth and tenth items, the characteristic data of the subject ash is specified based on the reflected light intensity characteristics of the subject ash, and the in-ash unburned combustibles concentration of the subject ash is calculated from the light intensity that is measured by using the correlation information contained in the characteristic data. Therefore, without being affected by a variation in the ash type, the in-ash unburned combustibles concentration can be calculated by using a correlation corresponding to the subject ash. This makes it possible to calculate the in-ash unburned combustibles concentration within a short period of time after the sampling of the ash.

The measurer 5, the arithmetic processor 71, and the storage 73 of the above-described in-ash unburned combustibles concentration measuring system 6 may be located in a concentrated manner at one place. Alternatively, the measurer 5, the arithmetic processor 71, and the storage 73 of the above-described in-ash unburned combustibles concentration measuring system 6 may be located in a distributed manner, and may be communicably connected to each other via a communication network. At least part of the functions of the arithmetic processor 71 may be realized in the form of a cloud service. In this case, when accessed from a computer, a cloud server may execute a predetermined program to function as the arithmetic processor 71, and may feed an in-ash unburned combustibles concentration measurement result back to the computer. The arithmetic processor 71 may save the in-ash unburned combustibles concentration measurement result in a cloud storage.

The in-ash unburned combustibles concentration measuring system 6 according to a third item of the present disclosure is configured such that in the in-ash unburned combustibles concentration measuring system 6 according to the first or second item, the first reflected light intensity index I1 of the subject ash 81 is a spectrum of a standardized reflectance, the standardized reflectance being determined by dividing a reflectance of the subject ash 81 by an average value of the reflectance.

The in-ash unburned combustibles concentration measuring method according to an eleventh item of the present disclosure is such that in the in-ash unburned combustibles concentration measuring method according to the ninth or tenth item, the first reflected light intensity index I1 of the subject ash 81 is a spectrum of a standardized reflectance, the standardized reflectance being determined by dividing a reflectance of the subject ash 81 by an average value of the reflectance.

According to the in-ash unburned combustibles concentration measuring system 6 of the third item and the in-ash unburned combustibles concentration measuring method of the eleventh item, since the standardized reflectance is used as the first reflected light intensity index I1, the reflected light intensity index can be obtained with a relatively simple manner. Also, since the standardized reflectance spectrum is used as the spectrum of the first reflected light intensity index I1, spectrum shape comparison can be readily performed.

The in-ash unburned combustibles concentration measuring system 6 according to a fourth item of the present disclosure is configured such that in the in-ash unburned combustibles concentration measuring system 6 according to any one of the first to third items, the second reflected light intensity index I2 of the subject ash 81 is a reflectance that is obtained by dividing a reflected light intensity measured for the subject ash 81 by a reflected light intensity measured for the standard white board 65.

The in-ash unburned combustibles concentration measuring method according to a twelfth item of the present disclosure is such that in the in-ash unburned combustibles concentration measuring method according to any one of the ninth to eleventh items, the second reflected light intensity index I2 of the subject ash 81 is a reflectance that is obtained by dividing a reflected light intensity measured for the subject ash 81 by a reflected light intensity measured for the standard white board 65.

According to the in-ash unburned combustibles concentration measuring system 6 of the fourth item and the in-ash unburned combustibles concentration measuring method of the twelfth item, since the reflectance is used as the second reflected light intensity index I2, the reflected light intensity index can be obtained with a relatively simple manner. Also, since the reflectance is used as the second reflected light intensity index I2, the information from which the elements contained in the measured reflected light intensity spectrum except the reflected light from the ash 81 have been eliminated is used, which makes it possible to determine the reflected light intensity of the ash 81 more accurately.

The in-ash unburned combustibles concentration measuring system 6 according to a fifth item of the present disclosure is configured such that in the in-ash unburned combustibles concentration measuring system 6 according to any one of the first to fourth items, each piece of characteristic data further contains information on a fuel type, and the arithmetic processor 71 further includes the fuel type estimator 714, which estimates the fuel type contained in the piece of characteristic data that has been selected to be the fuel type of the subject ash 81.

The in-ash unburned combustibles concentration measuring method according to a thirteenth item of the present disclosure is such that in the in-ash unburned combustibles concentration measuring method according to any one of the ninth to twelfth items, each piece of characteristic data further contains information on a fuel type, and the method further includes estimating the fuel type contained in the piece of characteristic data that has been selected to be the fuel type of the subject ash 81.

According to the in-ash unburned combustibles concentration measuring system 6 of the fifth item and the in-ash unburned combustibles concentration measuring method of the thirteenth item, the fuel type of the subject ash 81 can be specified, which makes it possible to perform control in accordance with the fuel type of the ash 81 in the next process for the ash 81.

The in-ash unburned combustibles concentration measuring method according to a fourteenth item of the present disclosure is such that the in-ash unburned combustibles concentration measuring method according to any one of items 9 to 13 further includes: measuring the in-ash unburned combustibles concentration of the subject ash 81 either by analyzing gas that is generated when the subject ash 81 is subjected to ignition or by measuring a weight of the subject ash 81 after the subject ash 81 is subjected to the ignition; and modifying, based on the measured in-ash unburned combustibles concentration, either the characteristic data of the subject ash 81 that is stored in the storage 73 or the characteristic data of ash whose fuel type corresponds to that of the subject ash 81.

According to the in-ash unburned combustibles concentration measuring method of the fourteenth item, the characteristic data is sequentially updated properly, which makes it possible to measure the in-ash unburned combustibles concentration with higher precision based on the reflected light intensity.

The electrostatic separator 1 according to a sixth item of the present disclosure includes: the ash layer 15, which is a layer of the ash 81 in which the conductive particles 16 and the insulating particles 18 are mixedly present; the conductive particle recovery container 41, which recovers the first powder B, which is separated from the ash 81 by electrostatic separation, the first powder B containing the conductive particles 16; the insulating particle recovery container 40, which recovers the second powder C, which is obtained by separating the first powder B from the ash 81; and the in-ash unburned combustibles concentration measuring system 6 according to any one of the first to fifth items, wherein the system 6 measures the in-ash unburned combustibles concentration of at least one of the first powder B or the second powder C.

The electrostatic separator 1 according to a seventh item of the present disclosure is configured such that in the electrostatic separator 1 according to the sixth item, the in-ash unburned combustibles concentration measuring system 6 further measures the in-ash unburned combustibles concentration of the ash 81.

According to the electrostatic separator 1 of the sixth and seventh items, the in-ash unburned combustibles concentration of each of the first powder B and the second powder C, which are separated and recovered by the electrostatic separator 1, can be monitored online by using the in-ash unburned combustibles concentration measuring system 6. Although the separation performance of the electrostatic separator 1 significantly varies depending on the type of the ash 81 fed thereto, continuous feedback of suitable operating conditions for the electrostatic separator 1 can be performed based on the measured in-ash unburned combustibles concentration.

In the electrostatic separator 1 according to an eighth item of the present disclosure is configured such that the electrostatic separator 1 according to the sixth or seventh item further includes: the gas dispersion plate 26 located at the bottom of the ash layer 15; at least one vibrator V in the ash layer 15, the at least one vibrator V being located above the gas dispersion plate 26; the fluidizing gas feeder 29, which feeds the fluidizing gas 31 through the gas dispersion plate 26 to lift the ash layer 15; the upper electrode 22 located above the ash layer 15; the lower electrode 28 in the ash layer 15, the lower electrode 28 being located on the same plane as that of the gas dispersion plate 26 or located above the gas dispersion plate 26; the power supply 20, which applies voltage between the upper electrode 22 and the lower electrode 28, such that one of the upper and lower electrodes 22 and 28 acts as a negative electrode and the other one of the upper and lower electrodes 22 and 28 acts as a positive electrode, and such that an electric field is generated between the positive and negative electrodes; the capturer 50, which captures the conductive particles 16 that have flown out of the surface of the ash layer 15 toward the upper electrode 22; and the control circuitry 2. The control circuitry 2: obtains the measured in-ash unburned combustibles concentration; and adjusts at least one of the feeding amount of the ash 81 to the ash layer 15, the voltage applied between the upper electrode 22 and the lower electrode 28, the capturing speed of the capturer 50, the vibration speed and amplitude of the vibrator V, or the inclination angle of the gas dispersion plate 26, such that either: the measured in-ash unburned combustibles concentration of the first powder B is higher than or equal to a predetermined first threshold; or the measured in-ash unburned combustibles concentration of the second powder C is less than or equal to a predetermined second threshold.

According to the electrostatic separator 1 of the eighth item, control parameters are automatically adjusted to achieve suitable operating conditions in accordance with the measured in-ash unburned combustibles concentrations of the powders. This makes it possible to automatically maintain desired separation performance of the electrostatic separator 1, and to consequently contribute to the realization of remote operation of the electrostatic separator 1.

Regarding the arithmetic processor 71 and the control circuitry 2 disclosed in the present disclosure, the functionality of these devices may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The discussions presented above in the present disclosure are presented for the purpose of giving examples and descriptions, and are not intended to limit the present disclosure to the modes disclosed herein. For example, in the above DETAILED DESCRIPTION, various features of the present disclosure are grouped together in one embodiment for the purpose of streamlining the present disclosure. However, the features included in the present disclosure can be combined with alternative embodiments, alternative configurations, or alternatively modes, other than those described above.

What is claimed is:

1. A system for measuring an in-ash unburned combustibles concentration, the system comprising:

a storage that stores therein pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash;

a measurer including:

a light source that irradiates ash with light; and a spectroscope that separates reflected light from the ash into multiple wavelengths, and measures reflected light intensities at the multiple wavelengths, respectively; and an arithmetic processor including:

an index calculator that obtains, for subject ash, the reflected light intensities that have been measured by the measurer at the multiple wavelengths, respectively, and based on the obtained reflected light intensities at the multiple wavelengths, calculates the first reflected light intensity index and the second reflected light intensity index of the subject ash;

a selector that obtains the first reflected light intensity index of the subject ash, and from among the pieces of characteristic data stored in the storage, selects a piece of characteristic data whose first reflected light intensity index is the same as, or similar to, the first reflected light intensity index of the subject ash; and an in-ash unburned combustibles concentration calculator that obtains the second reflected light intensity index of the subject ash, and by using the correlation information contained in the piece of characteristic data that has been selected, calculates an in-ash unburned combustibles concentration corresponding to the second reflected light intensity index of the subject ash as the in-ash unburned combustibles concentration of the subject ash.

2. The system for measuring an in-ash unburned combustibles concentration according to claim 1, wherein the first reflected light intensity index of the subject ash is a spectrum of a standardized reflectance, the standardized reflectance being determined by dividing a reflectance of the subject ash by an average value of the reflectance.

3. The system for measuring an in-ash unburned combustibles concentration according to claim 1, wherein the second reflected light intensity index of the subject ash is a reflectance that is obtained by dividing a reflected light intensity measured for the subject ash by a reflected light intensity measured for a standard white board.

4. The system for measuring an in-ash unburned combustibles concentration according to claim 1, wherein each piece of characteristic data further contains information on a fuel type, and the arithmetic processor further includes a fuel type estimator that estimates the fuel type contained in the piece of characteristic data that has been selected to be the fuel type of the subject ash.

5. An electrostatic separator comprising:

an ash layer that is a layer of ash in which conductive particles and insulating particles are mixedly present;

a conductive particle recovery container that recovers a first powder that is separated from the ash by electrostatic separation, the first powder containing the conductive particles;

an insulating particle recovery container that recovers a second powder that is obtained by separating the first powder from the ash; and a system for measuring an in-ash unburned combustibles concentration that measures the in-ash unburned combustibles concentration of subject ash, the subject ash being at least one of the first powder or the second powder, wherein the system for measuring the in-ash unburned combustibles concentration comprises:

a storage that stores therein pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash; and an arithmetic processor including:

a selector that obtains the first reflected light intensity index of the subject ash, and from among the pieces of characteristic data stored in the storage, selects a piece of characteristic data whose first reflected light intensity index is the same as, or similar to, the first reflected light intensity index of the subject ash; and an in-ash unburned combustibles concentration calculator that obtains the second reflected light intensity index of the subject ash, and by using the correlation information contained in the piece of characteristic data that has been selected, calculates an in-ash unburned combustibles concentration corresponding to the second reflected light intensity index of the subject ash as the in-ash unburned combustibles concentration of the subject ash.

6. The electrostatic separator according to claim 5, wherein the system further measures the in-ash unburned combustibles concentration of the ash.

7. The electrostatic separator according to claim 5, further comprising:

a gas dispersion plate located at a bottom of the ash layer;

at least one vibrator in the ash layer, the at least one vibrator being located above the gas dispersion plate;

a fluidizing gas feeder that feeds fluidizing gas through the gas dispersion plate to lift the ash layer;

an upper electrode located above the ash layer;

a lower electrode in the ash layer, the lower electrode being located on a same plane as that of the gas dispersion plate or located above the gas dispersion plate;

a power supply that applies voltage between the upper electrode and the lower electrode, such that one of the upper and lower electrodes acts as a negative electrode and the other one of the upper and lower electrodes acts as a positive electrode, and such that an electric field is generated between the positive and negative electrodes;

a capturer that captures the conductive particles that have flown out of a surface of the ash layer toward the upper electrode; and control circuitry, wherein the control circuitry:

obtains the measured in-ash unburned combustibles concentration; and adjusts at least one of a feeding amount of the ash to the ash layer, the voltage applied between the upper electrode and the lower electrode, a capturing speed of the capturer, a vibration speed and amplitude of the vibrator, or an inclination angle of the gas dispersion plate, such that either:

the measured in-ash unburned combustibles concentration of the first powder is higher than or equal to a predetermined first threshold; or the measured in-ash unburned combustibles concentration of the second powder is less than or equal to a predetermined second threshold.

8. A method of measuring an in-ash unburned combustibles concentration, the method comprising:

storing, in a storage, pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash;

irradiating subject ash with light;

separating, by a spectroscope, reflected light from the subject ash into multiple wavelengths, and measuring reflected light intensities at the multiple wavelengths, respectively; and calculating the first reflected light intensity index and the second reflected light intensity index based on the reflected light intensities of the subject ash that have been measured at the multiple wavelengths, respectively;

obtaining the first reflected light intensity index of the subject ash, and from among the pieces of characteristic data stored in the storage, selecting a piece of characteristic data whose first reflected light intensity index is the same as, or similar to, the first reflected light intensity index of the subject ash; and obtaining the second reflected light intensity index of the subject ash, and by using the correlation information contained in the piece of characteristic data that has been selected, calculating an in-ash unburned combustibles concentration corresponding to the second reflected light intensity index of the subject ash as the in-ash unburned combustibles concentration of the subject ash.

9. The method of measuring an in-ash unburned combustibles concentration according to claim 8, wherein the first reflected light intensity index of the subject ash is a spectrum of a standardized reflectance, the standardized reflectance being determined by dividing a reflectance of the subject ash by an average value of the reflectance.

10. The method of measuring an in-ash unburned combustibles concentration according to claim 8, wherein the second reflected light intensity index of the subject ash is a reflectance that is obtained by dividing a reflected light intensity measured for the subject ash by a reflected light intensity measured for a standard white board.

11. The method of measuring an in-ash unburned combustibles concentration according to claim 8, wherein each piece of characteristic data further contains information on a fuel type, and the method further comprises estimating the fuel type contained in the piece of characteristic data that has been selected to be the fuel type of the subject ash.

12. A method of measuring an in-ash unburned combustibles concentration, the method comprising:

storing, in a storage, pieces of characteristic data, each piece of characteristic data being characteristic data of ash and containing a first reflected light intensity index of the ash and correlation information between a second reflected light intensity index of the ash and an in-ash unburned combustibles concentration of the ash, wherein each of the first reflected light intensity index and the second reflected light intensity index is an index indicating a reflected light intensity of the ash;

obtaining the first reflected light intensity index of subject ash, and from among the pieces of characteristic data stored in the storage, selecting a piece of characteristic data whose first reflected light intensity index is the same as, or similar to, the first reflected light intensity index of the subject ash;

obtaining the second reflected light intensity index of the subject ash, and by using the correlation information contained in the piece of characteristic data that has been selected, calculating an in-ash unburned combustibles concentration corresponding to the second reflected light intensity index of the subject ash as the in-ash unburned combustibles concentration of the subject ash;

measuring the in-ash unburned combustibles concentration of the subject ash either by analyzing gas that is generated when the subject ash is subjected to ignition or by measuring a weight of the subject ash after the subject ash is subjected to the ignition; and modifying, based on the measured in-ash unburned combustibles concentration, either the characteristic data of the subject ash that is stored in the storage or the characteristic data of ash whose fuel type corresponds to that of the subject ash.

* * * * *